United States Patent [19]

Pasto

[11] Patent Number: 4,542,109

[45] Date of Patent: Sep. 17, 1985

[54] SILICON NITRIDE-CORDIERITE CERAMIC ARTICLE, AND PROCESS OF MANUFACTURE THEREOF

[75] Inventor: Arvid E. Pasto, Littleton, Mass.

[73] Assignee: GTE Laboratories Incorporated, Waltham, Mass.

[21] Appl. No.: 521,793

[22] Filed: Aug. 9, 1983

[51] Int. Cl.$^4$ ............................................. C04B 35/58
[52] U.S. Cl. ........................................ 501/97; 501/98
[58] Field of Search ................................ 501/9, 97, 98

[56] References Cited

U.S. PATENT DOCUMENTS

| | | | |
|---|---|---|---|
| 4,070,198 | 1/1978 | Chyung et al. | 501/9 |
| 4,104,442 | 8/1978 | Sussmuth | 428/428 |
| 4,143,182 | 3/1979 | Henney et al. | 427/226 |
| 4,283,360 | 8/1981 | Henmi et al. | 264/63 |

FOREIGN PATENT DOCUMENTS

| | | | |
|---|---|---|---|
| 2302438 | 7/1973 | Fed. Rep. of Germany | 501/97 |
| 2540015 | 3/1976 | Fed. Rep. of Germany | 427/226 |
| 2544437 | 4/1977 | Fed. Rep. of Germany | 501/97 |
| 44-9476 | 5/1969 | Japan | 501/97 |
| 56-471478 | 11/1981 | Japan | 501/97 |

OTHER PUBLICATIONS

Chemical Correspondence, May 20, 1983, vol. 1, Item 0055, p. 10.

*Primary Examiner*—James Poer
*Attorney, Agent, or Firm*—Ivan L. Ericson

[57] ABSTRACT

A silicon nitride-cordierite article, and process for fabricating is described. The silicon nitride imparts a high mechanical strength, and the cordierite contributes to a lower thermal conductivity making the composition especially useful for internal parts of a diesel engine. The mechanical strength can be increased by crystallizing the continuous cordierite glassy phase of the article. Crystallization of the continuous cordierite glassy phase is accomplished by the addition of a nucleating agent such as zirconium dioxide in the formulation and a subsequent reheating step after densification.

19 Claims, No Drawings

SILICON NITRIDE-CORDIERITE CERAMIC ARTICLE, AND PROCESS OF MANUFACTURE THEREOF

FIELD OF THE INVENTION

This invention relates to a ceramic composition, article and process of fabrication thereof. More particularly, it is concerned with a silicon nitride-cordierite composition, article, and process thereof.

BACKGROUND OF THE INVENTION

The decreasing availability of petroleum fuels dictates the need for more efficient engines for automobiles, trucks, and ships of private, commercial, and military use. In this regard, gas turbine and adiabatic diesel engines offer potential benefits over spark ignition gasoline engines. These new engines may also handle a wide range of fuels, including non-petroleum derived fuels such as methanol. Current state-of-the-art diesel and turbine engines have their critical hot gas-path parts constructed of metallic alloys. These alloys, however, limit the temperature at which a turbine can be operated, and thus place an upper bound on the (Carnot cycle) efficiency of the engine. Further, the metallic components must be cooled, and the associated cooling system hardware power requirement reduces the available power from the engine. Another problem with the use of alloys is the strategic nature of the raw materials. High performance engine alloys are based on nickel, chrome, and cobalt, for each of which the U.S. import dependency exceeds 75%. The latter two metals, especially, are potential problems inasmuch as their availability is uncertain.

The problem, then, is to develop materials suitable for use in advanced heat engines at temperatures higher than allowed by current alloy limitations. These materials should also have the ability to operate without external coolant systems, and should be composed of non-strategic materials.

Ceramics based on $Si_3N_4$ are leading contenders because they have high strength, excellent thermal shock resistance and good oxidation resistance. They can, for example, be plunged into water from above red heat and still have a fracture strength greater than 100,000 psi. These are properties more reminiscent of metals than ceramics, but, unlike metal, $Si_3N_4$ ceramics maintain their properties to much higher temperatures. For this reason, $Si_3N_4$-based ceramics are prime candidate materials for advanced heat engines.

Silicon nitride ceramics exhibit other characteristics desired in heat engine materials; they are composed of non-strategic raw materials, able to operate at temperatures higher than superalloys, and do not require cooling. They offer the further advantage of lower density, so that engine specific power can be further increased and specific fuel consumption decreased. The lower density also translates into faster response to power demand, resulting in higher performance engines. These advantages, however, are only attainable in ceramics which can be fabricated into intricate shapes of low porosity. Fabrication of silicon nitride to high density is difficult because of the covalent nature of the bonding and low diffusivity of the material. The most satisfactory way to accomplish densification is through liquid-phase sintering, which requires addition to the $Si_3N_4$ of other components.

SUMMARY OF THE INVENTION

In accordance with one aspect of the present invention, there is provided a new and improved ceramic article consisting essentially of a first phase of silicon nitride, a second continuous phase of cordierite, and a nucleating agent. The new and improved ceramic article has a density greater than 95 percent of theoretical density.

According to another aspect of the present invention, a new and improved ceramic article has a composition which comprises silicon nitride and cordierite. The approximate formula of the composition is $(Si_3N_4)_{(1-x)}(2MgO.2Al_2O_3.5SiO_2)_x$ wherein x is from about 0.05 to about 0.75, preferably from about 0.10 to about 0.40.

According to another aspect of the present invention, there is provided a new and improved process for fabricating a densified ceramic article. The process comprises blending silicon nitride, magnesium oxide, silicon dioxide, aluminum sesquioxide, and a nucleating agent to form a powder mixture. The powder mixture is pressed to form a ceramic article. The ceramic article is sintered at an effective temperature in an inert atmosphere to form a densified ceramic article. The densified ceramic article consists essentially of a first phase of silicon nitride and a second continuous phase of cordierite and a nucleating agent. The densified ceramic article is reheated at an effective temperature for an effective time to crystallize the second continuous phase of cordierite.

According to another aspect of the present invention, there is provided another new and improved process for fabricating a densified ceramic article. The process comprises blending silicon nitride, magnesium oxide, silicon dioxide, and aluminum sesquioxide to form a powder mixture. The powder mixture is pressed to form a ceramic article. The ceramic article is sintered at an effective temperature in an inert atmosphere to form a densified ceramic article. The densified ceramic article consists essentially of a first phase of silicon nitride and a second continuous phase of cordierite.

According to another aspect of the present invention, there is provided another new and improved process for fabricating a densified ceramic article. The process comprises blending silicon nitride, magnesium oxide, silicon dioxide, aluminum sesquioxide, and a nucleating agent to form a powder mixture. The powder mixture is densified to form a densified ceramic article having a crystalline silicon nitride first phase, a continuous glassy cordierite second phase and a nucleating agent. The densified ceramic article is heated to a temperature sufficient to form a plastic densified ceramic article. The plastic densified ceramic article is molded to form a molded densified ceramic article. The continuous glassy cordierite second phase of the molded densified ceramic article is crystallized to form a rigid, molded densified ceramic article.

DETAILED DESCRIPTION OF THE INVENTION

The new and improved ceramic compositions of the present invention comprise silicon nitride and cordierite. Cordierite is represented by the formula $2MgO.2Al_2O_3.5SiO_2$ and silicon nitride by $Si_3N_4$. The silicon nitride imparts a high mechanical strength and the cordierite lowers the thermal conductivity making the composition especially useful for internal parts of an adiabatic diesel engine. The new compositions lend themselves to consolidation by hot-pressing, cold pressing, or other cold forming processes such as injection molding or slip casting, and sintering to form a densified ceramic article having a density greater than 95% of theoretical.

The densified ceramic article can have a modulus of rupture greater than 110 KSI (kilopound per square inch) at temperatures about 900° C. and greater than 35 KSI at temperatures greater than 1000° C. depending on its composition (see Table VI).

Some of the compositions contain sufficient levels of a continuous glassy or amorphous cordierite phase so that an article can be formed by other techniques, e.g. glass-forming methods.

The continuous glassy cordierite phase may be crystallized by the addition of a nucleating agent such as $ZrO_2$ and a subsequent reheating step in the processing steps.

Crystallizing the continuous cordierite phase will increase the mechanical strength of the resulting densified ceramic article.

The first phase of silicon nitride is a dispersed phase within the continuous cordierite phase.

EXAMPLES

Articles having various compositions, indicated by Mix #1 through 5 in Table I, were prepared by blending together the powders of the various components, such as silicon nitride, aluminum sequioxide, silicon dioxide, magnesium oxide and with or without a nucleating agent such as zirconium dioxide, titanium dioxide, in a plastic ball mill using milling media such as silicon nitride, cordierite, or zirconium dioxide to avoid contamination. The powders were pressed at pressures of about 5,000 psig (pounds per square inch gauge) to about 20,000 psig, preferably from about 10,000 psig to about 20,000 psig in a steel die into pellets and sintered in a flowing inert atmosphere such as $N_2$, at several temperatures, while sitting atop a bed of boron nitride powder. The density results shown in Table II indicate that these materials may be sintered to high density. The sintering temperatures in Table II were 1400° C., 1500° C. and 1600° C. However, sintering temperatures range from about 1400° C. to about 1800° C. X-ray diffraction characterization of the products as shown in Table III indicates the lack of development of a crystalline cordierite phase, whereas when the compositions are doped with a nucleating agent, in this case 3 w/o $ZrO_2$, the continuous glassy cordierite phase can be crystallized upon subsequent heat treatment (Table IV). Further, the powders described in Table I can be consolidated to essentially fully dense shapes by hot-pressing in boron nitride-lined graphite dies as shown in Table V. All the densities shown in Table V are greater than 97% of theoretical density. Modulus of rupture bars were machined from these shapes and tested. The modulus of rupture data for these compositions, as measured on bars 0.05" high×0.1" wide×1.0" long in four-point bending, is presented in Table VI. Table VII illustrates the lower thermal conductivity values which could be obtained by adding cordierite to silicon nitride.

The sintered mixtures of silicon nitride-cordierite containing higher levels of cordierite exhibit significant plasticity (e.g.—see Table VI, Mix #5) at elevated temperatures. The approximate formulation of these mixtures is $(Si_3N_4)_{(1-x)}(2MgO.2Al_2O_3.5SiO_2)_x$ plus a nucleating agent such as zirconium dioxide wherein x is from about 0.50 to about 0.75 and the amount of nucleating agent is from about one to about 5 w/o, preferably 3 w/o. Forming, molding or shaping techniques can be used with these materials while they are in the plastic state. The forming, molding or shaping can be done either during the late stages of sintering, or separately after the sintering step by various techniques such as applying pressure in the form of an uniaxial compression through a boron nitride-lined graphite (or pure boron nitride) die set such that the plastic material deforms to fit the shape of the die. For an example, a flat disc of pressed powder or partially or fully sintered material is set atop a cone-shaped depression in a boron nitride billet, and a cone-shaped plunger pushes down from above to form a conical radome. Alternatively, given sufficient pressure, temperature, and/or glassy second phase of cordierite, one could use a die cavity (mold) and a blast of hot air or steam pressure to push the material into shape. These and other processes are described on pages 64–69 of *Introduction to Ceramics*, by W. D. Kingery (J. Wiley and Sons, Inc., 2nd Printing, 1963) Many shapes could theoretically be formed, such as discs, cones, pistons, cylinder heads, tubing and rods, for examples.

The advantages of shaping a material to its final form in this way are:

(1) Starting from a fully dense sintered piece (e.g. disc), the shaping operation results in a fully dense part. It is much easier to sinter a simple shape (disc) to full density than it is to sinter a complex shape. Also, the part will be formed without sintering shrinkage, which may be inhomogeneous from area to area within a part. This lack of homogenity leads to warping or distortion and loss of dimensional control.

(2) The part can be made flaw-free. It is the residual voids and porosity left from a typical powder pressing/sintering operation which limit the strength and reliability of a material. The glass-forming technique squeezes these voids out, or precludes their presence in the first place.

(3) If the shaped part is then crystallized by reheating, the resultant material has superior properties to the uncrystallized material. On the other hand, if the expected use temperature is below the glassworking range, the glassy-phase uncrystallized material may be suitable as is.

TABLE I

| | Batch Constituents to Produce Silicon Nitride-Cordierite Composites | | | | |
|---|---|---|---|---|---|
| | Vol. Frac. Cordierite | Constituent Added (w/o) | | | |
| Mix # | Desired | Silicon Nitride* | MgO | $SiO_2$ | $Al_2O_3$ |
| 1 | 5 | 97.82 | 0.55 | 0.24 | 1.39 |
| 2 | 10 | 93.68 | 1.11 | 2.41 | 2.80 |
| 3 | 25 | 80.70 | 2.86 | 9.19 | 7.24 |
| 4 | 50 | 57.01 | 6.07 | 21.57 | 15.35 |
| 5 | 75 | 30.32 | 9.68 | 35.52 | 24.49 |

*Used GTE Sylvania SN502 powder, containing 0.98% oxygen as analyzed.

TABLE II

| | Results of Sintering of Silicon Nitride-Cordierite Composites | |
|---|---|---|
| Mix # | Sintering Temperature (a) (°C.) | Sintered Density (b) (% of Theoretical) |
| 1 | 1400 | 97.6 |
| | 1500 | 96.7 |
| | 1600 | 95.0 |
| 2 | 1400 | 96.6 |
| | 1500 | 97.6 |

TABLE II-continued

Results of Sintering of Silicon Nitride-Cordierite Composites

| Mix # | Sintering Temperature [a] (°C.) | Sintered Density [b] (% of Theoretical) |
|---|---|---|
|  | 1600 | 94.5 |
| 3 | 1400 | 96.2 |
|  | 1500 | 96.2 |
|  | 1600 | 95.7 |
| 4 | 1400 | 100.5 |
|  | 1500 | 91.1 |
|  | 1600 | 99.0 |
| 5 | 1400 | 104.7 |
|  | 1500 | 83.2 |
|  | 1600 | 96.8 |

[a] 2 hours at temperature
[b] as measured by immersion in water, theoretical density calculated by rule of mixtures

TABLE III

Phases Present after Sintering in Silicon Nitride-Cordierite Composites

| Mix # | Sintering Temp. (°C.) | Phases Detected (in decreasing relative order) |
|---|---|---|
| 1 | 1400 | $\alpha$-$Si_3N_4$, $\beta$-$Si_3N_4$ |
|  | 1500 | $\alpha$-$Si_3N_4$, $\beta$-$Si_3N_4$, $Si_2ON_2$ |
|  | 1600 | $\beta$-$Si_3N_4$, $\alpha$-$Si_3N_4$, $Si_2ON_2$ |
| 2 | 1400 | $\alpha$-$Si_3N_4$, $\beta$-$Si_3N_4$ |
|  | 1500 | $\alpha$-$Si_3N_4$, $\beta$-$Si_3N_4$, $Si_2ON_2$ |
|  | 1600 | $\beta$-$Si_3N_4$, $\alpha$-$Si_3N_4$, $Si_2ON_2$ |
| 3 | 1400 | $\alpha$-$Si_3N_4$, $\beta$-$Si_3N_4$, $Si_2ON_2$ |
|  | 1500 | $\alpha$-$Si_3N_4$, $Si_2ON_2$, $\beta$-$Si_3N_4$ |
|  | 1600 | $\beta$-$Si_3N_4$, $Si_2ON_2$, $\alpha$-$Si_3N_4$ |
| 4 | 1400 | $\alpha$-$Si_3N_4$, $\beta$-$Si_3N_4$, unid.[a], amorphous[b] |
|  | 1500 | $\alpha$-$Si_3N_4$, $\beta$-$Si_3N_4$, unid., $Si_2ON_2$, amorphous |
|  | 1600 | $Si_2ON_2$, $\beta$-$Si_3N_4$, $\alpha$-$Si_3N_4$, unid., amorphous |
| 5 | 1400 | $\alpha$-$Si_3N_4$, $\beta$-$Si_3N_4$, unid., amorphous |
|  | 1500 | $\alpha$-$Si_3N_4$, $\beta$-$Si_3N_4$, unid., $Si_2ON_2$, amorphous |
|  | 1600 | $Si_2ON_2$, $\beta$-$Si_3N_4$, $\alpha$-$Si_3N_4$, unid., amorphous |

[a] unid. = unidentified compound
[b] amorphous phase difficult to determine quantitatively, and so may be in incorrect order

TABLE IV

Development of Crystalline Cordierite in Silicon Nitride-Cordierite Composite Containing 50 v/o Cordierite

| Material Condition | $\alpha$-$Si_3N_4$ | $\beta$-$Si_3N_4$ | amorphous | $Si_2ON_2$ | cord. | unid |
|---|---|---|---|---|---|---|
| mix #4 + 3w/o $ZrO_2$ as-sintered | 80 | 5–10 | 10 | 2–5 | 0 | 2 |
| as-sintered plus 2 hrs at 800° C. | 80 | 5–10 | 10 | 2–5 | 0 | 2 |
| as-sintered plus 2 hrs at 900° C. | 80 | 5–10 | 10 | 2–5 | 0 | 2 |
| as-sintered plus 2 hrs at 950° C. | 80 | 10 | 10 | 4+ | trace | 2 |
| as-sintered plus 2 hrs at 1000° C. | 80 | 10 | 10 | 4+ | 1 | 2 |
| as-sintered plus 2 hrs at 1050° C. | 80 | 10 | 10 | 4+ | 3 | 2 |
| as-sintered plus 2 hrs at 1100° C. | 80 | 10 | 10 | 4+ | 15+ | 2 |

TABLE V

Hot-Pressing of Silicon Nitride-Cordierite Composites

| Mix # | Temp (°C.) | Time (hrs) | Press. (ksi) | Density (% of theoretical)[a] |
|---|---|---|---|---|
| 1 | 1600 | 3 | 5 | 99.7 |
| 2 | 1600 | 3 | 5 | 99.7 |
| 3 | 1400 | 3 | 5 | 99.7 |
| 4 | 1300 | 2 | 5 | 97.7 |
| 5 | 1300 | ½ | 5 | 102.5 |

[a] by immersion in water, theoretical density calculated by rule of mixtures

TABLE VI

Modulus of Rupture of Silicon Nitride-Cordierite Composites

| Mix # | Test Temperature (°C.) | Modulus of Rupture (ksi) |
|---|---|---|
| 1 | 22 | 125, 112 |
|  | 1000 | 91, 100 |
|  | 1200 | 50, 55 |
| 2 | 22 | 138, 114 |
|  | 1000 | 95, 99 |
|  | 1200 | 40, 40 |
| 3 | 22 | 60, 63 |
|  | 1000 | 66, 61 |
|  | 1200 | 45, 41 |
| 4 | 22 | 32, 30 |
|  | 1000 | 36, 33 |
|  | 1200 | 21, 19 |
| 4 plus 3 w/o $ZrO_2$, crystallized at 1100° C. | 22 | 41, 44, 40, 38 |
|  | 1000 | 46, 48 |
|  | 1200 | 24, 22 |
| 5 | 22 | 24, 24 |
|  | 1000 | material plastic: |
|  | 1200 | did not break |

TABLE VII

Thermal Conductivity of Silicon Nitride-Cordierite Mixtures

| Volume % Cordierite | Thermal Conductivity (Cal/cm-sec-°C.) |
|---|---|
| 0 | 0.060 |
| 5 | 0.049 |
| 10 | 0.041 |
| 20 | 0.030 |
| 25 | 0.0265 |
| 30 | 0.023 |
| 40 | 0.018 |
| 50 | 0.0147 |
| 75 | 0.0087 |
| 100 | 0.005 |

While there has been shown and described what is at present considered the preferred embodiment of the invention, it will be obvious to those skilled in the art that various changes and modifications may be made therein without departing from the scope of the invention as defined by the appended claims.

What is claimed is:

1. A ceramic article consisting essentially of a first phase of silicon nitride, a second continuous phase of cordierite, and a nucleating agent, said ceramic article having a density greater than 95 percent of theoretical density, said second continuous phase of cordierite being essentially crystalline.

2. A ceramic article in accordance with claim 1 wherein said ceramic article contains from about 5 to about 75 volume percent of said second continuous phase of cordierite.

3. A ceramic article in accordance with claim 1 wherein said nucleating agent consists essentially of zirconium dioxide in the amount from about 1 to about 5 weight percent of said ceramic article.

4. A ceramic article in accordance with claim 1 wherein said ceramic article has a modulus of rupture greater than 110 KSI at temperatures of about 900° C.

5. A ceramic article in accordance with claim 1 wherein said ceramic article has a modulus of rupture greater than 35 KSI at temperatures greater than 1000° C.

6. A ceramic article having a composition comprising of silicon nitride, and cordierite, said composition having an approximate formula $(Si_3N_4)_{(1-x)}(2MgO.2Al_2O_3.5SiO_2)_x$ wherein x is from about 0.05 to about 0.75, said ceramic article having a density greater than 95 percent of theoretical density.

7. A process for fabricating a densified ceramic article comprising
blending silicon nitride, magnesium oxide, silicon dioxide, aluminum sesquioxide, and a nucleating agent to form a powder mixture;
pressing said powder mixture to form a ceramic article;
sintering said ceramic article at an effective temperature in an inert atmosphere to form a densified ceramic article consisting essentially of a first phase of silicon nitride and a second continuous phase of cordierite and a nucleating agent; and
reheating said densified ceramic article at an effective temperature for an effective time to crystallize said second continuous phase of cordierite.

8. A process in accordance with claim 7 wherein the effective temperature of said sintering step is from about 1400° C. to about 1800° C.

9. A process in accordance with claim 7 wherein said densified ceramic article is sintered to a density greater than 95 percent of theoretical density.

10. A process in accordance with claim 7 wherein said powder mixture is pressed at a pressure of about 5,000 psig to about 20,000 psig.

11. A process in accordance with claim 7 wherein the silicon nitride, magnesium oxide, silicon dioxide, aluminum sesquioxide and a nucleating agent are blended in a non-metallic ball mill using non-contaminating milling media.

12. A process in accordance with claim 11 wherein said non-contaminating milling media is selected from the group consisting of silicon nitride, cordierite, zirconium dioxide, and mixtures thereof.

13. A process in accordance with claim 7 wherein the effective temperature and the effective time of said reheating step is from about 900° C. to about 1100° C. for at least 2 hours.

14. A process for fabricating a molded densified ceramic article comprising
blending silicon nitride, magnesium oxide, silicon dioxide, aluminum sesquioxide and a nucleating agent to form a powder mixture;
densifying said powder mixture to form a densified ceramic article having a crystalline silicon nitride first phase, a continuous glassy cordierite second phase and a nucleating agent;
heating said densified ceramic article at a temperature sufficient to form a plastic densified ceramic article;
molding said plastic densified ceramic article to form a molded densified ceramic article;
crystallizing said continuous glassy cordierite second phase of said molded densified ceramic article to form a rigid, molded densified ceramic article.

15. A process in accordance with claim 14 wherein the step of densifying comprises
pressing said powder mixture to form a ceramic article; and
sintering said ceramic article at a temperature from about 1400° C. to about 1800° C. in an inert atmoshere to form a densified ceramic article.

16. A process in accordance with claim 14 wherein said powder mixture is densified to a density greater than 95 percent of theoretical density.

17. A process in accordance with claim 15 wherein said powder mixture is pressed at a pressure of about 5,000 psig.

18. A process in accordance with claim 14 wherein said powder mixture has an approximate formulation $(Si_3N_4)_{(1-x)}(2MgO.2Al_2O_3.5SiO_2)_x$ wherein x is from about 0.50 to about 0.75 and a nucleating agent being from about one to about 5 weight percent of said powder mixture.

19. A process in accordance with claim 18 wherein said nucleating agent is zirconium dioxide.

* * * * *